(12) United States Patent
Herscher et al.

(10) Patent No.: US 12,472,001 B2
(45) Date of Patent: Nov. 18, 2025

(54) CRYOGENIC TREATMENT DEVICE ENCODER

(71) Applicant: Channel Medsystems, Inc., Berkeley, CA (US)

(72) Inventors: Bret Herscher, Cupertino, CA (US); Bruce Ackerman, Fairfax, CA (US); William Malecki, Oakland, CA (US)

(73) Assignee: Channel Medsystems, Inc., Berkeley, CA (US)

( * ) Notice: Subject to any disclaimer, the term of this patent is extended or adjusted under 35 U.S.C. 154(b) by 1292 days.

(21) Appl. No.: 17/171,467

(22) Filed: Feb. 9, 2021

(65) Prior Publication Data
US 2022/0249173 A1    Aug. 11, 2022

(51) Int. Cl.
*A61B 34/20*    (2016.01)
*A61B 17/00*    (2006.01)
(Continued)

(52) U.S. Cl.
CPC .............. *A61B 34/20* (2016.02); *A61B 18/00* (2013.01); *A61B 18/02* (2013.01);
(Continued)

(58) Field of Classification Search
CPC .. A61B 2017/0003; A61B 2018/00053; A61B 2018/00196; A61B 2018/00577;
(Continued)

(56) References Cited

U.S. PATENT DOCUMENTS

| 4,420,754 A | 12/1983 | Andermo |
| 4,733,235 A * | 3/1988 | Baer .................... G01D 5/2403 324/683 |

(Continued)

FOREIGN PATENT DOCUMENTS

| DE | 102015007550 A1 | 10/2015 |
| DE | 102018208276 A1 | 11/2018 |

(Continued)

OTHER PUBLICATIONS

Das, Subir et al., "Simple approach to design a capacitive rotary encoder," IET Sci. Meas. Technol., vol. 12 Iss. 4, pp. 500-506, 2018.
(Continued)

*Primary Examiner* — Linda C Dvorak
*Assistant Examiner* — Bradford C. Blaise
(74) *Attorney, Agent, or Firm* — Levine Bagade Han LLP

(57) ABSTRACT

A treatment system for treating tissue is disclosed in which a handle with an elongate shaft projecting from the handle, a sheath axially slidable relative to the elongate shaft, and an electrode mounted on a proximal portion of the sheath is provided. A substrate having an elongate portion may be located within the handle. A plurality of first and second capacitive sensors may be positioned along the elongate portion. The electrode may be configured to slide along the elongate portion during movement of the sheath. The electrode may maintain contact with at least one of the first capacitive sensors at least one of the second capacitive sensors during movement of the sheath. The substrate may be configured to determine an axial position of the electrode based on a coupling capacitance caused by an electrode overlapping one or more of the first capacitive sensors and one or more of the second capacitive sensors.

17 Claims, 5 Drawing Sheets

(51) Int. Cl.
*A61B 18/00* (2006.01)
*A61B 18/02* (2006.01)

(52) U.S. Cl.
CPC .............. *A61B 2017/0003* (2013.01); *A61B 2018/00196* (2013.01); *A61B 2018/00577* (2013.01); *A61B 2018/0091* (2013.01); *A61B 2034/2053* (2016.02); *A61B 2034/2059* (2016.02)

(58) Field of Classification Search
CPC .. A61B 2018/0091; A61B 2018/00946; A61B 2018/0212; A61B 2018/0231; A61B 18/02; A61B 2034/2059
See application file for complete search history.

(56) References Cited

U.S. PATENT DOCUMENTS

| | | | |
|---|---|---|---|
| 4,841,225 A * | 6/1989 | Meyer | G01D 5/2415 |
| | | | 340/870.37 |
| 6,700,391 B2 * | 3/2004 | Strack | G01D 5/2412 |
| | | | 324/662 |
| 7,126,495 B2 | 10/2006 | Netzer | |
| 8,858,543 B2 | 10/2014 | Burnett et al. | |
| 9,035,663 B2 | 5/2015 | Carley | |
| 9,226,767 B2 | 1/2016 | Stulen et al. | |
| 9,277,952 B2 | 3/2016 | Burnett et al. | |
| 9,283,022 B2 | 3/2016 | Burnett et al. | |
| 9,377,282 B2 | 6/2016 | Dockrey et al. | |
| 9,408,657 B2 | 8/2016 | Burnett et al. | |
| 9,445,860 B2 | 9/2016 | Burnett et al. | |
| 9,486,267 B2 | 11/2016 | Burnett et al. | |
| 9,492,217 B2 | 11/2016 | Burnett et al. | |
| 9,492,218 B2 | 11/2016 | Burnett et al. | |
| 9,498,274 B2 | 11/2016 | Burnett et al. | |
| 9,510,887 B2 | 12/2016 | Burnett et al. | |
| 9,517,100 B2 | 12/2016 | Burnett et al. | |
| 9,603,650 B2 | 3/2017 | Burnett et al. | |
| 9,687,230 B2 | 6/2017 | Leimbach et al. | |
| 9,714,846 B2 * | 7/2017 | Baxter | G01D 5/2412 |
| 9,877,042 B1 | 1/2018 | Jansson et al. | |
| 9,901,342 B2 | 2/2018 | Shelton, IV et al. | |
| 9,913,642 B2 | 3/2018 | Leimbach et al. | |
| 9,993,248 B2 | 6/2018 | Shelton, IV et al. | |
| 10,168,182 B2 | 1/2019 | Hanke et al. | |
| 10,265,120 B2 | 4/2019 | Yates et al. | |
| 10,492,844 B2 | 12/2019 | Cote et al. | |
| 2006/0071671 A1 | 4/2006 | Tola et al. | |
| 2006/0173381 A1 | 8/2006 | Eck | |
| 2014/0005648 A1 | 1/2014 | Burnett et al. | |
| 2015/0080869 A1 | 3/2015 | Burnett et al. | |
| 2015/0201918 A1 | 7/2015 | Kumar et al. | |
| 2015/0289920 A1 | 10/2015 | Burnett et al. | |
| 2016/0183999 A1 | 6/2016 | Burnett et al. | |
| 2017/0007347 A1 | 1/2017 | Jaworek et al. | |
| 2018/0071006 A1 | 3/2018 | Burnett et al. | |
| 2018/0207396 A1 | 7/2018 | Franklin | |
| 2018/0220533 A1 | 8/2018 | Rissing et al. | |
| 2018/0338787 A1 * | 11/2018 | Cote | A61B 90/98 |
| 2019/0000535 A1 | 1/2019 | Messerly et al. | |
| 2019/0056247 A1 * | 2/2019 | Erlich | H02K 41/02 |
| 2019/0099180 A1 | 4/2019 | Leimbach et al. | |
| 2019/0105043 A1 | 4/2019 | Jaworek et al. | |
| 2020/0015876 A1 | 1/2020 | Chou et al. | |
| 2020/0378741 A1 * | 12/2020 | Dietz | G01B 7/28 |

FOREIGN PATENT DOCUMENTS

| | | |
|---|---|---|
| WO | WO 2004/050156 | 7/2005 |
| WO | WO 2018/217412 | 11/2018 |
| WO | WO 2022/173479 | 8/2022 |

OTHER PUBLICATIONS

Kim, Moojin et al., "A new linear encoder-like capacitive displacement sensor," Measurement, 39, 481-489, 2006.

Peng, Kai et al., "Features of Capacitive Displacement Sensing That Provide High-Accuracy Measurements with Reduced Manufacturing Precision," IEEE Transactions on Industrial Electronics, vol. 64, No. 9, Sep. 2017.

RLS-2019 Linear magnetic encoders, https://www.rls.si/eng/linear?gclid=EAlalQobChMI5Mjlm_Tp4glVhbfACh3cbwifEAAYASAAEgK0d_D_BwE p. 1-9 This company's website lists a number of linear PCB level encoders; some technical features are presented, Jun. 17, 2019.

* cited by examiner

CRYOGENIC TREATMENT DEVICE ENCODER

FIELD OF THE INVENTION

The present invention relates to medical devices. In particular, the present invention relates to methods and apparatus for the treatment of tissue regions using a linear encoder to determine the position of the device.

BACKGROUND OF THE INVENTION

Advances in technology have led to changes for various surgical procedures. Surgical procedures that use catheters to access the uterine cavity, for example, may be characterized as minimally invasive, meaning that they generally are achieved with less operative trauma for the patient, reduced hospitalization time, less pain and scarring, reduced incidence of complications related to surgical trauma, lower costs, and a speedier recovery. Some of these procedures involve the delivery of a cryogenic agent for ablating the contacted tissue within the body of a subject.

However, a user may not be able to visualize a catheter or receive tactile feedback to get a sense of the location of a distal end of the catheter in real-time. Linear encoders can be used within tissue treatment devices to help users determine the location of the catheter during surgery. Traditional linear encoders use measurements of capacitance along one set of capacitive sensors along a length of a printed circuit board to determine a position of a target. Traditional linear encoders also generally depend on the resistance of a linear resistive element or on the contact of a wiper to that element. These traditional methods can be subject to inaccuracies due to variance in temperature and may have hardware that is susceptible to damage during sterilization procedures. Conventional approaches such as linear potentiometers and traditional linear encoders also may be costly and difficult to manufacture.

As such, the current state of the art would benefit from linear encoders that require no calibration and that can accurately and reliably measure the location of a device during surgery while utilizing a method that is invariant with temperature and utilizing hardware that is resistant to damage during sterilization procedures.

SUMMARY OF THE INVENTION

One variation of a treatment system may include a handle with an elongate shaft projecting from the handle. A sheath may be axially slidable relative to the elongate shaft. The sheath may have an electrode mounted on a proximal portion of the sheath. A substrate may be located within the handle. The substrate may have an elongate portion. A plurality of first capacitive sensors may be positioned along the elongate portion. The first capacitive sensors may be aligned linearly and may each have a first length. A plurality of second capacitive sensors may be positioned along the elongate portion adjacent to the plurality of first capacitive sensors. Each of the second capacitive sensors may be aligned linearly and may have a second length which is less than the first length. The electrode may be configured to slide along the elongate portion during movement of the sheath. The electrode may maintain contact with at least one of the first capacitive sensors at least one of the second capacitive sensors during movement of the sheath. The substrate may be configured to determine an axial position of the electrode based on a coupling capacitance caused by the electrode overlapping one or more of the first capacitive sensors and one or more of the second capacitive sensors.

The first length may be perpendicular to the second length. The plurality of first and second capacitive sensors may be positioned along a first lateral side of the elongate portion. A plurality of first pin oscillator connections and a plurality of second pin oscillator connections may be positioned along a second lateral side of the elongate portion. The plurality of first capacitive sensors may correspond with each of the plurality of first pin oscillator connections. The plurality of second capacitive sensors may correspond with each of the plurality of second pin oscillator connections. Each of the plurality of first and second pin oscillator connections may be connected to at least one port on a microcontroller.

The substrate may be configured to measure a period of oscillation of each of the first and second pin oscillator connections. The treatment system may comprise a rotatable knob configured to retract the sheath. The electrode may be mounted on a slider block. The slider block may be configured to move axially with respect to the substrate. The treatment system may further comprise an expandable liner. The expandable liner may be coupled to the elongate shaft. Proximal movement of the sheath relative to the elongate shaft may expose the expandable liner.

One variation of a method for treating tissue may generally comprise advancing an elongated shaft to a target site. The elongate shaft may project from a handle. The method may also include sliding a sheath proximally relative to the elongate shaft. The sheath may have an electrode attached to a proximal portion of the sheath. The method may also include determining an axial position of the sheath by measuring a capacitance caused by the overlapping one or more of the first capacitive sensors and one or more of the second capacitive sensors as the electrode slides along a substrate located within the handle. The substrate may comprise an elongate portion having a plurality of first capacitive sensors positioned along the elongate portion. Each of the first capacitive sensors may be aligned linearly and may have a first length. The substrate may comprise a plurality of second capacitive sensors positioned along the elongate portion adjacent to the plurality of first capacitive sensors. Each of the second capacitive may be aligned linearly and have a second length. The second length may be less than the first length and may be perpendicular to the first length. The substrate may comprise a printed circuit board.

The method may also comprise maintaining contact between the printed circuit board and the electrode during movement of the sheath. The electrode may be mounted on a proximal portion of the sheath via a sliding block. The plurality of first and second capacitive sensors may be positioned along a first lateral side of the elongate portion. A plurality of first pin oscillator connections and a plurality of second pin oscillator connections may be positioned along a second lateral side of the elongate portion. Each of the plurality of first capacitive sensors may correspond with each of the plurality of first pin oscillator connections. Each of the plurality of second capacitive sensors may correspond with each of the plurality of second pin oscillator connections. Each of the first and second pin oscillator connections may be connected to at least one port on a microcontroller. The method may also comprise measuring a period of oscillation of each of the first and second pin oscillator connections using the substrate. The method may also comprise exposing an expandable liner by retracting the sheath proximally. The expandable liner is coupled to the elongated shaft at a distal end of the elongate shaft.

A substrate comprising a printed circuit board may be provided. The printed circuit board may comprise an elongate portion. A plurality of first capacitive sensors may be positioned along the elongate portion. The first capacitive sensors may be aligned linearly and may have a first length. A plurality of second capacitive sensors may be positioned along the elongate portion adjacent to the plurality of first capacitive sensors. Each of the second capacitive sensors may be aligned linearly and may have a second length which is less than the first length. The printed circuit board may be configured to maintain contact with an electrode during axial movement of the electrode. The substrate may be configured to determine an axial position of the electrode based on a coupling capacitance of the caused by the electrode overlapping one or more of the first capacitive sensors and one or more of the second capacitive sensors.

The first and second plurality of capacitive sensors may be positioned along a first lateral side of the elongate portion. A plurality of first pin oscillator connections and a plurality of second pin oscillator connections may be positioned along a second lateral side of the elongate portion. Each of the plurality of first capacitive sensors may correspond with each of the plurality of first pin oscillator connections. Each of the plurality of second capacitive sensors may correspond with each of the plurality of second pin oscillator connections. The first and second pin oscillator connections may be each connected to at least one port on a microcontroller.

DETAILED DESCRIPTION OF THE INVENTION

Figure 1A:
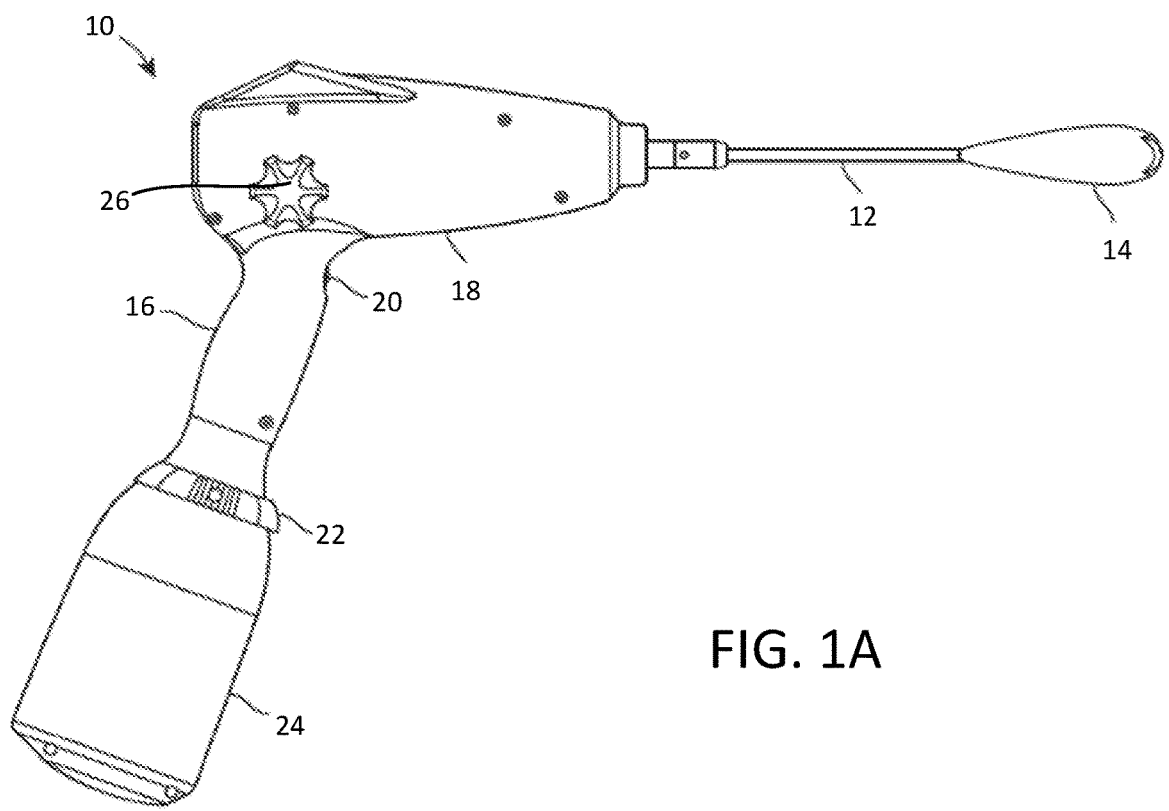
FIG. 1A shows a side view of a treatment assembly.
Figure 1B:
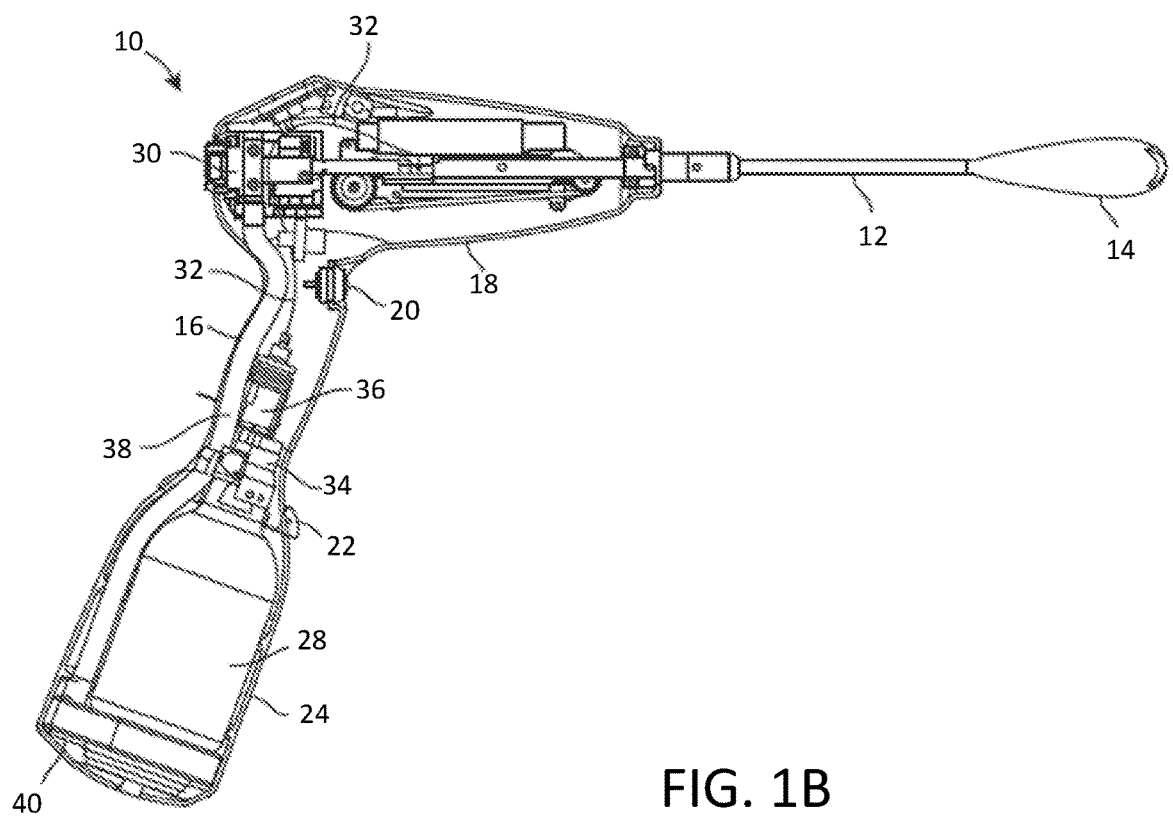
FIG. 1B shows a partial cross-sectional side view of a treatment assembly.

FIGS. 1A and 1B show side and partial cross-sectional side views of treatment assembly 10 which may comprise a housing 18 having a handle 16 and a reservoir housing 24 extending from and attached directly to the handle 16.

The assembly 10 may integrate the elongate shaft 60 having the liner or balloon 20 extending therefrom with a cooling probe (not shown) positioned translatably within the shaft 60 and liner 20. A separate translatable sheath 12 may be positioned over the elongate shaft 18 and both the elongate shaft 18 and sheath 12 may be attached to a handle assembly 16. The handle assembly 16 may further comprise an actuator 20 for controlling a translation of the sheath 12 for liner 20 delivery and deployment.

With the sheath 12 positioned over the elongate shaft 60 and liner 14, the assembly 10 may be advanced to a target site where the sheath 12 may be retracted via the handle assembly 16 to expose the liner 14. Once the liner 18 is initially deployed from the sheath 12, it may be expanded by an initial burst of a gas, e.g., air, carbon dioxide, etc., or by cryoablative fluid. The handle assembly 16 may also be used to actuate and control a longitudinal position of the sheath 12 relative to the elongate shaft 60 and liner 14 via a rotatable knob 26 placed on the outer surface of handle 16. Distal movement of the sheath 12 relative to the elongate shaft 60 may collapse the liner 14 into the interior of the sheath 12.

The sheath 12 having the expandable liner 14 may extend from the housing 18 while an actuator 20 may be located, for instance, along the handle 16 to enable the operator to initiate the cryoablative treatment. A reservoir or canister 28 fully containing the cryoablative agent may be inserted and retained within the reservoir housing 24. The reservoir housing 24 and/or the handle 16 may further incorporate a reservoir engagement control 22 which may be actuated, e.g., by rotating the reservoir engagement control 22 relative to the handle 16, to initially open fluid communication with the reservoir or canister 28 to charge the system for treatment.

The reservoir or canister 28 may be inserted into the reservoir housing 24 and into secure engagement with a reservoir or canister valve 34 which may be coupled to the reservoir engagement control 22. The valve 34 may be adjusted to open the reservoir or canister 28 for treatment or for venting of the discharged cryoablative agent during or after treatment. An inflow modulation control unit 36 (e.g., an actuatable solenoid mechanism) may be coupled directly to the reservoir or canister valve 34 and the cryoablative fluid line 32 may be coupled directly to the modulation control unit 36 and through the sheath 12 and into fluid communication within the expandable liner 14, as described herein.

During or after treatment, discharged cryoablative fluid may be evacuated through the exhaust block 30 contained within the housing 18 and then through the exhaust line 38 coupled to the exhaust block 30. The exhaust line 38 may extend through the handle 16 and the reservoir housing 24 and terminate at an exhaust line opening 40 which may be attached to another exhaust collection line, as further described herein.

An actuatable sheath control 26 may be attached to the slider base block assembly 58 for manually controlling the treatment length of the treatment assembly 10 as well. Along with electronics and pump assembly (which may optionally incorporate a programmable processor or controller in electrical communication with any of the mechanisms within the handle 16), an exhaust valve (e.g., actuated via a solenoid) may be coupled to the exhaust line 38 for controlling not only the outflow of the exhausted cryoablation fluid or gas but also for creating or increasing a backpressure during treatment.

Once the sheath 12 and/or liner 14 has been advanced and initially introduced into the target site, the liner 14 may be expanded or inflated in a pre-treatment puff up to expand the liner 14 into contact against the uterine tissue surfaces in preparation for a cryoablation treatment. A pump integrated within the handle assembly 16 may be actuated and a valve (e.g., actuatable or passive) fluidly coupled to the pump may be opened such that ambient air may be drawn in through, e.g., an air filter integrated along the handle 16, and passed through an air line within the handle 16 and to an exhaust block. The exhaust block and air line may be fluidly coupled to the tubular exhaust channel which extends from the handle 16 which is further attached to the cooling probe. As the air is introduced into the interior of the liner 14, the liner 14 may be expanded into contact against the tissue surface.

The cryoablative fluid line 32 also extending into and integrated within the handle assembly 16 may be fluidly coupled to an actuatable valve, e.g., actuated via a solenoid, which may be manually closed or automatically closed by a controller to prevent the introduction of the cryoablative fluid or gas into the liner 14 during the pre-treatment liner expansion. An infusion line may be fluidly coupled to the valve and may also be coupled along the length of the sheath 12 and probe. The exhaust valve coupled to the exhaust line may also be closed manually or automatically by the controller to prevent the escape of the air from the exhaust block 30.

Once the liner 14 has been expanded sufficiently into contact against the tissue surface, the cryoablation treatment may be initiated. The air pump may be turned off and the valve may be closed to prevent any further infusion of air into the liner 20. With the cryoablative fluid or gas pressurized within the line, the valve may be opened to allow for the flow of the cryoablative fluid or gas to flow through the infusion line coupled to the valve. Infusion line may be routed through or along the sheath 12 and along the probe where it may introduce the cryoablative fluid or gas within the interior of liner 14 for infusion against the liner 14 contacted against the surrounding tissue surface.

During treatment or afterwards, the exhaust valve may also be to allow for the discharged fluid or gas to exit or be drawn from the liner interior and proximally through the cooling probe, such as through the distal tip opening. The fluid or gas may exit from the liner 14 due to a pressure differential between the liner interior and the exhaust exit and/or the fluid or gas may be actively drawn out from the liner interior, as described in further detail herein. The spent fluid or gas may then be withdrawn proximally through the probe and through the lumen surrounded by the sheath 12, exhaust block 30, and the exhaust tube where the spent fluid or gas may be vented. With the treatment fluid or gas thus introduced through the infusion line within the liner 14 and then withdrawn, the cryoablative treatment may be applied uninterrupted.

Once a treatment has been completed, the tissue region may be permitted to thaw. During this process, the cryoablative fluid delivery is halted through the infusion line by closing the valve while continuing to exhaust for any remaining cryoablative fluid or gas remaining within the liner 14 through the probe, through the lumen surrounded by sheath 12, and exhaust line 38. Optionally, a pump and valve may be cycled on and off and the exhaust valve may also be cycled on and off to push ambient air into the liner 14 to facilitate the thawing of the liner 14. Optionally, warmed or room temperature air or fluid (e.g., saline) may also be pumped into the liner 14 to further facilitate thawing of the tissue region.

As the spent cryoablative fluid or gas is removed from the liner 14, a drip prevention system may be optionally incorporated into the handle. For instance, a passive system incorporating a vented trap may be integrated into the handle which allows exhaust gas to escape but captures any vented liquid. The exhaust line 38 may be elongated to allow for any vented liquid to evaporate or the exhaust line 38 may be convoluted to increase the surface area of the exhaust gas tube to promote evaporation.

Alternatively, an active system may be integrated into the handle or coupled to the handle 16 where a heat sink may be connected to a temperature sensor and electrical circuit which is controlled by a processor or microcontroller. The heat sink may promote heat transfer and causes any liquid exhaust to evaporate. When the temperature of the heat sink reaches the boiling temperature of, e.g., nitrous oxide (around −86° C.), the handle may be configured to slow or stop the delivery of the cryoablative fluid or gas to the uterine cavity.

The pre-treatment infusion of air as well as the methods for treatment and thawing may be utilized with any of the liner, probe, or apparatus variations described herein. Moreover, the pre-treatment, treatment, or post-treatment procedures may be utilized altogether in a single procedure or different aspects of such procedures may be used in varying combinations depending upon the desired results.

Optionally, the handle 16 may incorporate an orientation sensor to facilitate maintaining the handle 16 in a desirable orientation for treatment. One variation may incorporate a ball having a specific weight covering the exhaust line 38 such that when the handle 16 is held in the desirable upright orientation, the treatment may proceed uninterrupted. However, if the handle 16 moved out of its desired orientation, the ball may be configured to roll out of position and trigger a visual and/or auditory alarm to alert the user. In another variation, an electronic gyroscopic sensor may be used to maintain the handle 16 in the desired orientation for treatment.

Further variations of the treatment assembly features and methods which may be utilized in combination with any of the features and methods described herein may be found in the following U.S. Pat. Nos. 9,283,022; 9,486,267; 9,498,274; 9,445,860; 9,492,217; 9,510,887; 9,517,100; 9,492,218; 9,408,657; 8,858,543; 9,277,952; 9,603,650; and 10,492,844. They may also be found in the following U.S. patent application Ser. No. 14/029,641 filed Sep. 17, 2013 (U.S. Pub. 2015/0080869); Ser. No. 14/019,928 filed Sep. 6, 2013 (U.S. Pub. 2014/005648); Ser. No. 14/265,799 (U.S. Pub. 2015/0289920); and Ser. No. 15/065,684 (U.S. Pub. 2016/0183999).

Each of the patent applications above is incorporated herein by reference in its entirety and for any purpose herein.

During a treatment procedure, the sheath 12 having the expandable liner 14 may be retracted or advanced linearly to selectively expose the liner 14 and which also determines a treatment area of the tissue to be treated. Hence, an accurate measurement of the linear position of the sheath 12 relative to the liner 14 is desirable and a substrate 42 having a plurality of capacitive sensors positioned thereon may be used with a slidable electrode to facilitate measurement of the liner position.

Figure 2A:
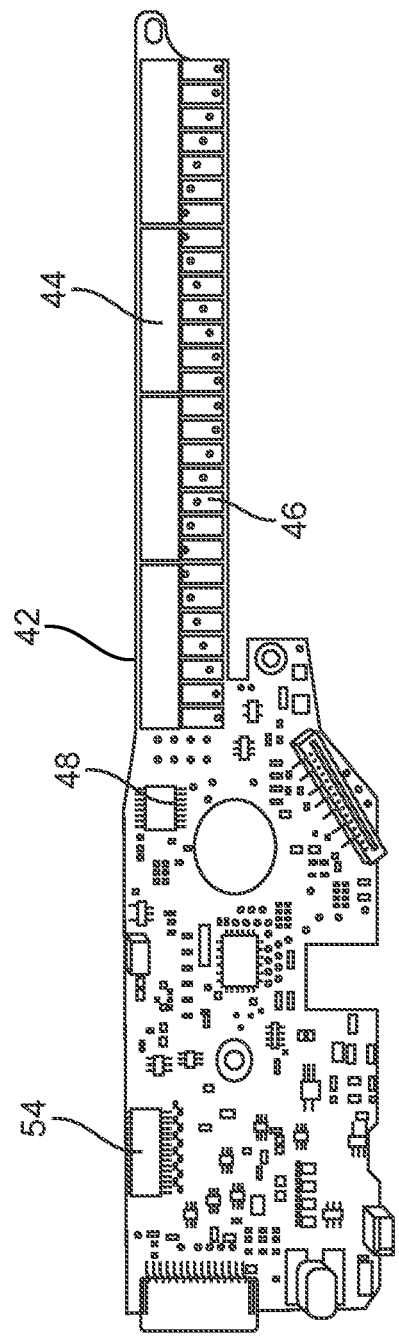
FIGS. 2A and 2B show opposing side views of a substrate.
Figure 2B:
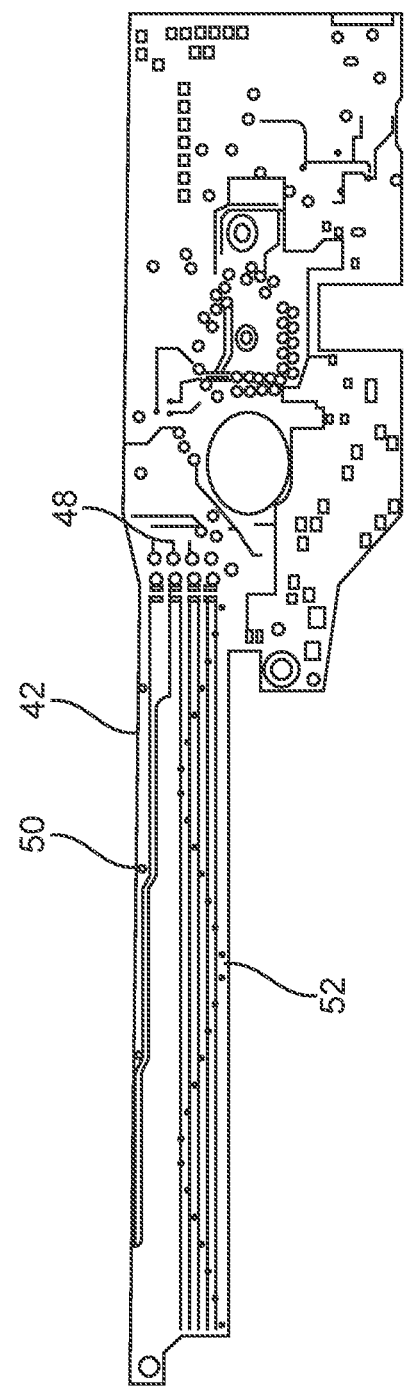

FIGS. 2A and 2B show opposing side views of a substrate 42. The substrate may be implemented into the handle 16 of the treatment assembly 10. The substrate 42 may also have a printed circuit board 48 and a microcontroller 54 although multiple microcontrollers may be used. Additionally, the substrate 42 may have an elongate portion along an axial length of the substrate 42.

FIG. 2A shows a first lateral side of the substrate 42 having a plurality of capacitive sensors positioned along the elongate portion of the printed circuit board 48. A plurality of first capacitive sensors 44 may be positioned along the elongate portion of the substrate 42. The plurality of first capacitive sensors 44 may be aligned adjacent to one another along the length of the elongate portion. Each of the plurality of first capacitive sensors 44 may have a first length and extend linearly along the length of the substrate 42. A plurality of second capacitive sensors 46 may be positioned on the elongate portion of the substrate 42. The plurality of second capacitive sensors 46 may be aligned adjacent to one another along the length of the elongate portion and also extend linearly along the length of the substrate 42. Each of the plurality of second capacitive sensors 46 may have a second length. The second length may be less than the first length and may be perpendicular to the first length and the plurality of second capacitive sensors 46 may extend in parallel adjacent to the plurality of first capacitive sensors 44 such that the first and second sensors are positioned to be co-parallel. Although in other variations, rather than extending in parallel, the first and second capacitive sensors may extend at an angle relative to one another or form another configuration relative to one another. As a result, the elongate portion may comprise, for example, four first capacitive sensors and twenty-eight second capacitive sensors, although other variations may be considered. For instance, in the variation shown, for every one of the first capacitive sensor 44, seven of the second capacitive sensors 46 may extend uniformly to have the same or similar length. The first and second capacitive sensors may each have a width of about 3 mm, though it is understood that the size of the sensors may be determined by a desired resolution. Each of the first and second capacitive sensors may be made of small copper pads that may be electrically coupled to or uncoupled from an AC ground by a microcontroller 54 having a microprocessor which may control certain functions via its software.

Microcontroller 54 may be an integrated circuit that includes a CPU (e.g., the microprocessor) and other additional components. Additional components may include a plurality of input/output (I/O) pins. I/O pins may also be configured as capacitive touch I/O pins. The microcontroller may also have a plurality of ports thereon. For example, the microcontroller may have a plurality of general I/O ports coupled to the first capacitive sensors 44 and a plurality of capacitive "touch" sensing ports for the second capacitive sensors 46. It should be appreciated that any variations of pins and ports may be used in accordance with the microcontroller.

The corresponding electrical connections are shown on the second lateral side of the encoder board in FIG. 2B. A plurality of first pin oscillator connections 50 and second pin oscillator connections 52 may be located on the second lateral side of the substrate 42. Each of the plurality of first pin oscillator connections 50 may be individually connected to at least one port of the microcontroller 54 so that each of the first capacitive sensors 44 may be individually coupled to ground or left floating as controlled by the microcontroller 54. Each of the plurality of second pin oscillator connections 52 may electrically connect with a pin oscillator of the microcontroller 54 and a number of the second capacitive sensors 46. Different oscillations may be measured for each pin oscillator along the length of substrate 42, as each of the first capacitive sensors 44 is connected to an AC or a DC ground in turn. It is readily observed, for example, that in a design containing N first capacitive sensors and M first pin oscillator connections, as many as N times M discrete locations may be defined by the intersection of one of the N first capacitive sensors 44 with one of the M first pin oscillator connections 50. The first pin oscillator connections 50 and second pin oscillator connections 52 may comprise thin traces and through-holes that are electrically connected to microcontroller 54. It may be demonstrated that a resolution far greater than the N times M individual discrete locations can be achieved by interpolation between the locations. To do so, second pin oscillator connections 52 may be constrained to ensure that no two adjacent second capacitive sensors 46 are connected to the same second pin oscillator connection.

Figure 3A:
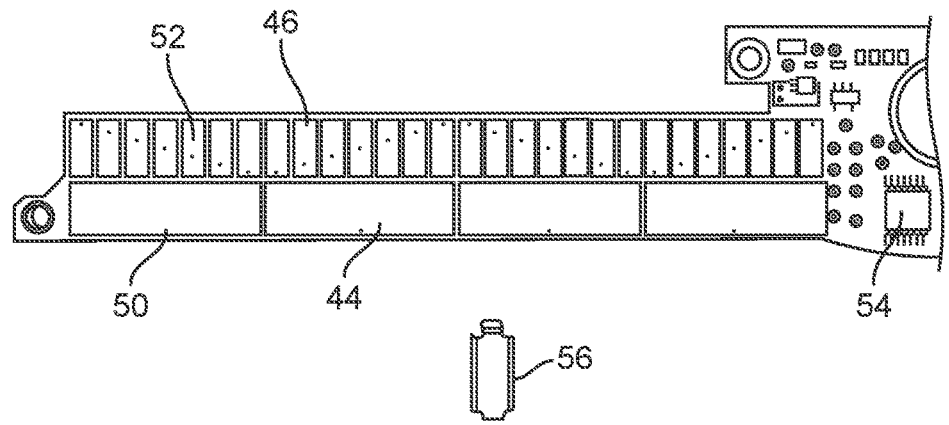
FIGS. 3A to 3C show side views of a substrate with an electrode slidably positionable over the substrate.
Figure 3B:
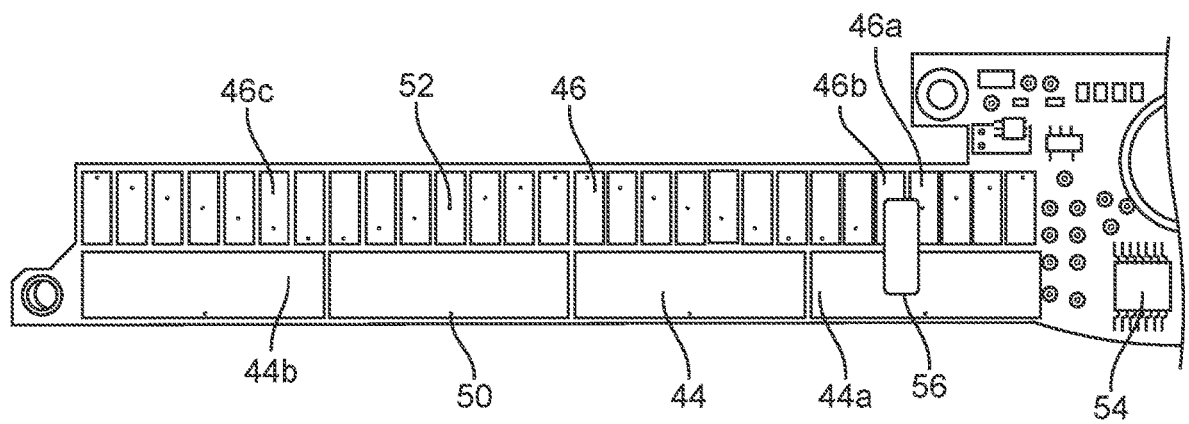
Figure 3C:
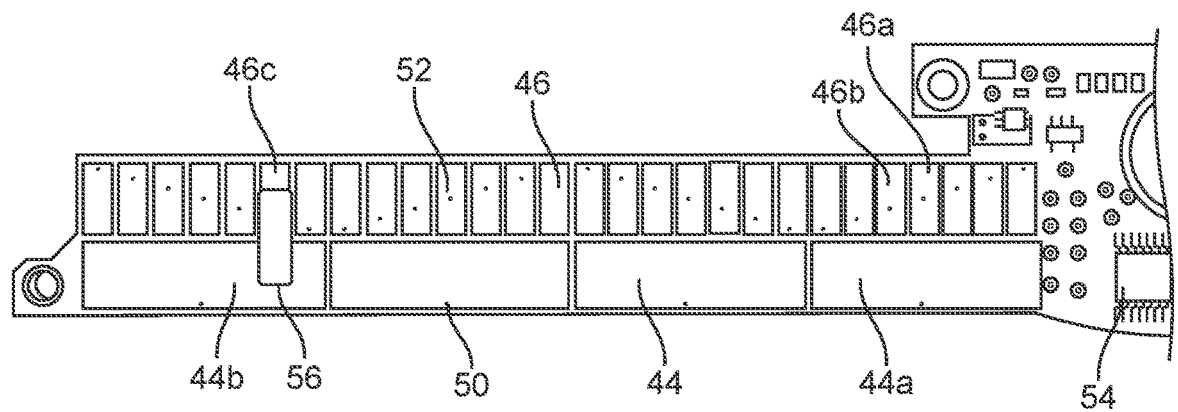

FIGS. 3A to 3C show side views of the substrate 42 with electrode 56 in different positions along the substrate 42. The electrode 56 may slide along the length of the substrate 42 and as the electrode 56 slides, the electrode 56 may electrically couple to at least one of the first capacitive sensors 44 and at least one of the second capacitive sensors 46. FIG. 3B shows the electrode 56 positioned along a proximal position of the substrate 42 while in contact with a first capacitive sensor 44 at a first position while simultaneously in contact with second capacitive sensors 46a and 46b. It should be appreciated that the electrode 56 may be in contact with two first capacitive sensors 44 simultaneously and two second capacitive sensors 46 simultaneously.

FIG. 3C shows wherein electrode 56 may be positioned in a more distal position along the substrate 42 with respect to the more proximal position shown in FIG. 3B. The electrode 56 may be positioned solely within the width of the second capacitive sensors 46, for example, second capacitive sensor 46c as seen in FIG. 3C. The electrode 56 may be moved in a distal direction or a proximal direction along the longitudinal axis of the substrate 42. This movement of electrode 56 may be the result of longitudinal sheath 12 movement. During this movement, liner 14 and shaft 60 may also move longitudinally along with the sheath 12. Alternatively, liner 14 and shaft 60 may remain in a particular longitudinal position when sheath 12 and electrode 56 are moved longitudinally.

As the electrode 56 is moved along the substrate 42, the electrode 56 may sense a slowing in the frequency of oscillation in one or more of the pin oscillator connections as each of the first capacitive sensors 44 are connected to AC ground in turn. The location of the electrode 56 may be determined by which of the first capacitive sensors 44 is connected to ground and which of the pin oscillator connections experiences the slowing of the frequency of oscillation. Further, the microcontroller may interpolate between each of the second capacitive sensors 46 by analyzing the amount of slowing of each of the second pin oscillator connections 52. In FIG. 3B for example, the second pin oscillator connections 52 connected to the second capacitive sensors 46 overlapped by the electrode 52 may experience approximately the same amount of slowing in their frequency of oscillation, because the electrode 52 overlaps each capacitive sensor 46 approximately the same amount. In these cases when the electrode 56 overlaps two capacitive sensors 46, it may be shown that the change of period of the two oscillations is proportional to the relative areas of the two overlaps, allowing for accurate interpolation to within a small fraction of the sensor separation. Electrical signals from each sensor may be sent to microcontroller 54 and may differ according to the specific sensor contacted by electrode 56. The signal may also depend on the surface area of the contact between the sensor and electrode 56. Thus, different signals from first capacitive sensors 44 and second capacitive sensors 46 along the longitudinal axis may allow a user to determine the longitudinal position of the sheath 12. As further described herein, the period of each of the individual pin oscillators 50, 52 within each sensor may be different between multiple pin oscillators 50, 52 to facilitate signal differentiation. The electrical signals from the sensors are sent to the microcontroller 54 from each port of the coupled pin oscillators. To measure the linear position of the electrode 56 along the elongate portion, a linear encoder integrated into the printed circuit board 48 may measure the frequencies of the pin oscillators as each of the first capacitive sensors 44 is connected to an AC ground in turn. The linear encoder comprises a software that will be described in further detail below.

Figure 4A:
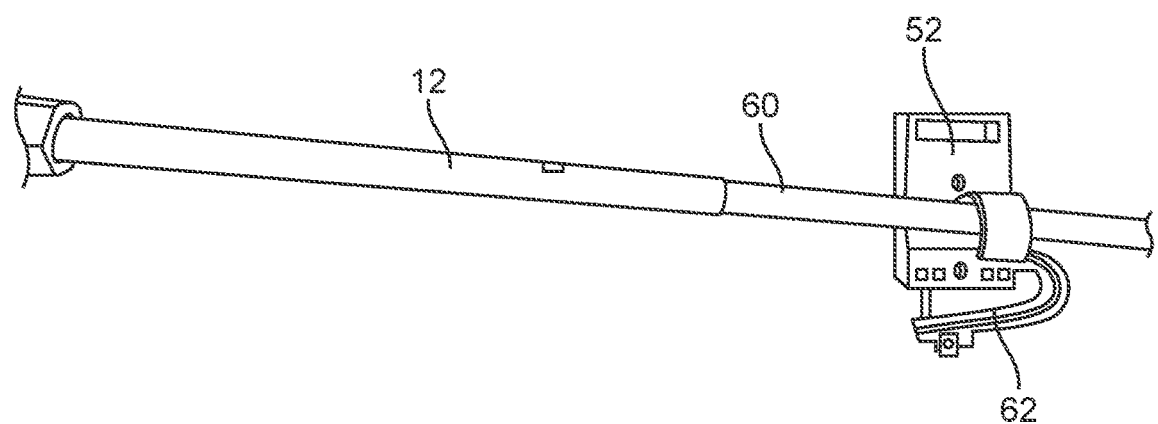
FIG. 4A shows a perspective view of a sheath and a shaft having an electrode mounted on a slider block.
Figure 4B:
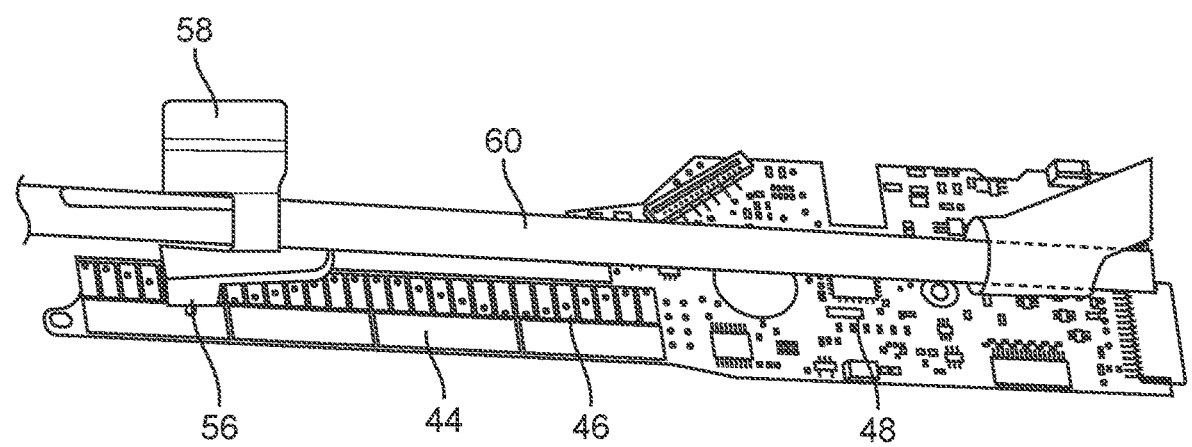
FIG. 4B shows a perspective view of a slider block in contact with the substrate.

Turning now to FIGS. 4A and 4B, the sheath 12 and the shaft 60 are shown having an electrode 56 mounted on a carriage or slider block 58 which is positioned to extend in parallel and in proximity over the substrate 42 such that the electrode 56 may be maintained in contact with the substrate 42. The slider block 58 may have a spring-loaded or otherwise biased arm 62 that allows for flexibility of the sheath 12 with respect to the substrate 42 when the sheath 12 is moved axially and the slider block 58 is translated in a corresponding manner. The biased arm 62 may be configured as a spring-loaded member which is biased to maintain AC contact between electrode 56 and substrate 42 during proximal or distal movement of the sheath. In other variations, the biased arm 62 may be configured to incorporate any number of features which enable the arm 62 to provide or otherwise push the electrode 56 against the underlying substrate 42 in a steady or constant manner to ensure that AC contact is maintained between the two. This also ensures maximum accuracy of the coupling capacitance measurement caused by the electrode 56 throughout the operation of the treatment assembly 10. The linear encoder may measure pin oscillator frequencies as the sliding electrode 56 moves along the plurality of first capacitive sensors 44 and along the plurality of second capacitive sensors 46.

Figure 5:
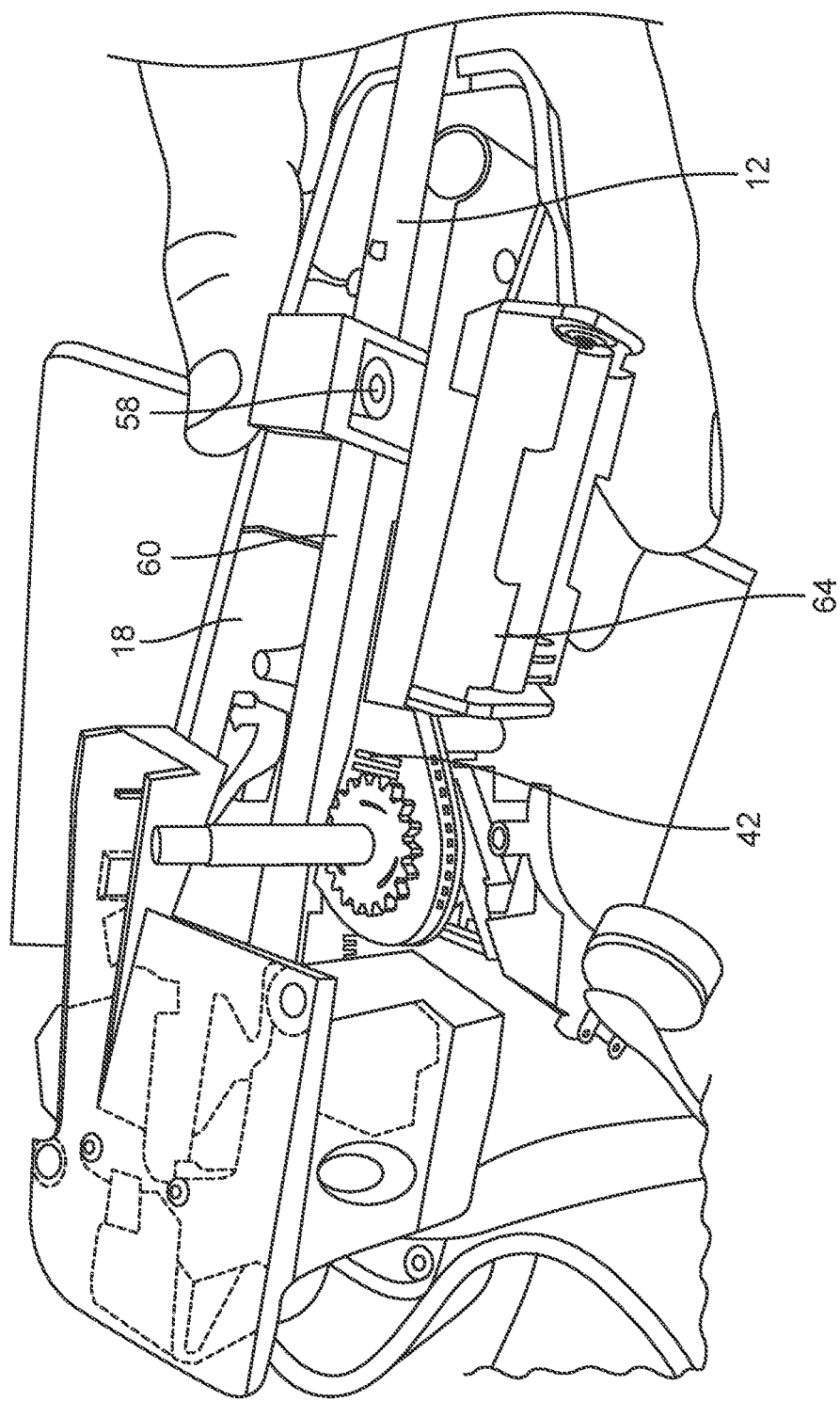
FIG. 5 shows a sectional perspective view of a handle within the treatment assembly.

FIG. 5 shows a sectional view of the handle 16. The slider block 58 may be positioned within the handle 16 which defines a space within the handle 16 through which the slider block 58 may translate. The slider block 58 may also be connected to the rotatable knob 26 on the handle 16. Rotation of the rotatable knob 26 may move the slider block 58 proximally or distally. The substrate 42 may be placed within the handle 16 such that the elongate portion of the substrate 42 remains aligned with the elongate shaft 60 allowing for the capacitive sensors to maintain contact with the electrode 56 via the arm 62 as the electrode 56 is translated over the sensors. The treatment assembly 10 may be powered by a battery 64 located within the handle 16 or via any power supply in electrical communication.

The software may reside in nonvolatile memory (FRAM) within the microprocessor. The software may acquire the position of the movable electrode 56 along a portion of the capacitive sensors located along the printed circuit board 48 and may report that position continuously to the microcontroller 54. Other than the position data along the substrate 42, acquired as described herein, and a single digital line (SYNC) used to signal the main processor's being ready to receive UART communication, there may optionally be no other external input to the software. The software may output a UART Transmit pin. A nRST (processor Reset) pin may be used during development.

Prior to beginning acquisition of the position data, and during such acquisition, numerous Power-On Self Tests (POST), ongoing Self-Health Tests and data integrity tests may be performed. Should any such test fail, position acquisition is terminated, and a Fault code is transmitted repeatedly to the main processor.

The linear encoder may accurately and reliably measure the linear position of the electrode 56 along a section of the printed circuit board 48, utilizing a method that may be invariant with temperature, and utilizing hardware that may be more robust and resistant to damage during sterilization procedures. The method may require no calibration.

These goals may be achieved by measuring the pin oscillator frequencies as each of the first capacitive sensors 44 is connected to an AC ground in turn. To achieve this, several pins on the microcontroller 54 may include a built-in pin (relaxation) oscillator which may be made of an internal resistor $R_{pin}$ and the capacitance from the Pin to ground $C_{pin}$. When configured to be touch sensitive the pin oscillator may oscillate with a period given by the following equation (1):

$$T_{pin} = KR_{pin}C_{pin} \qquad (1)$$

where,
$T_{pin}$=charge time (seconds)
K=time constant
$R_{pin}$=resistance of pin (Ohms)
$C_{pin}$=capacitance of pin to ground (Farads)

The period of each pin oscillator may be between 0.5 μs and 1 μs and can be increased by adding more capacitance to the pin, making the pin oscillate with a longer period. Although the K and the $R_{pin}$ are fairly closely matched from pin to pin, the capacitance $C_{pin}$ may be very different from pin to pin. This is because, even without any printed circuit board traces, each pin may have different peripherals hanging on it internal to the chip adding more or less capacitance to the pin. Further, the external capacitance of the printed circuit board traces may affect each pin differently, dependent on the physical layout. As such, when the pin oscillator is enabled for each pin on the bare board, very different periods (or frequencies) may be measured on each pin. Thus, the absolute value of the frequency or period of any particular pin oscillator may be taken with respect to another pin oscillator.

A portion of the capacitance may be turned on and off by connecting and disconnecting each of the first capacitive sensors from an ΔC ground. The change in capacitance may be measured by ΔC. Each pin has a period when the extra capacitance is on given by the following equation (2):

$$T_{pinon} = KR_{pin}(C_{pin} + \Delta C) \qquad (2)$$

where,
$T_{pinon}$=charge time when pin is ON
ΔC=change in capacitance

The change of period between when the pin is on and when the pin is off may then be measured by the following equation (3):

$$T_{pinon} - T_{pinoff} = KR_{pin}\Delta C \qquad (3)$$

where,
$T_{pinon}$=charge time when pin is ON
$T_{pinoff}$=charge time when pin is OFF By measuring the difference in periods, the linear encoder may obtain a reading of coupling capacitance which is reasonably independent of the physical pin being used. In the linear encoder, the plurality of first capacitive sensors 44 are alternated between ground and floating. The electrode 56 may make a coupling capacitance between one or more of the plurality of first capacitive sensors 44 and one or more of the plurality of second capacitive sensors 46, as seen in FIG. 2A. When one or more of the first capacitive sensors 44 are floated, these coupling capacitance(s) may disappear. When one or more of the first capacitive sensors 44 is grounded the coupling capacitance caused by the electrode 56 may increase the period of one or more of the second capacitive sensors 46 overlapping the electrode 56 and creates a measurable change in period for those second capacitive sensors 46.

The second capacitive sensors 46 may be wired into four sets of seven capacitive sensors, each set being connected to seven pin oscillators 52. The periods of the seven pin oscillators 52 may be measured with each of the first capacitive sensors 44 grounded and floating open circuit. Most of the combinations between sensor capacitances may yield very small differences in period, but between one and three combinations (depending on the exact position of the electrode 56 bridging the rows to the columns) indicate a relatively larger difference. From the differences in period, the linear encoder may determine the closest of the first and second capacitive sensors 44, 46 to the electrode 56. The linear encoder may also interpolate between the first and second capacitive sensors 44, 46, yielding an accuracy and resolution finer than the 3 mm finger spacing.

The software may repeatedly determine the position of the electrode 56 by, for each of the second capacitive sensors 46, measuring the period of the second pin oscillator connections 52 both with the adjacent first capacitive sensors 44 grounded and with the first capacitive sensors 44 floating. These measurements may determine a noticeable peak in the area of the electrode 56, indicating a position of the electrode 56.

The software may also perform subsequent signal processing to accomplish additional general functions. The software may correct the values for observed stray capacitance using a baseline correction and may also qualify the measurements as to the existence of the expected single well-defined peak. The software may also interpolate in the area of the peak to increase measurement resolution and it may also transmit the interpolated peak position.

The following is a detailed description, referring to the code and to actual data captured during code execution, of the processes of data acquisition, the subsequent signal processing, data transmission, and the ancillary code functions including initialization and fault detection.

The linear encoder code may be written, e.g., in C for the Texas Instruments compiler, in three modules. The Encoder module (Encoder.c) may contain the main( ) function, which performs initialization and POST and then enters the measurement loop. Each pass through the measurement loop may perform one acquisition of the measurements, the subsequent signal processing, and transmission of one position measurement. The measurement loop may continue indefinitely. The SelfTest module (SelfTest.c, SelfTest.h) may contain functions involved in POST and ongoing Self-Health Tests. The Communications module (Communications.c, Communications.h) may contain functions involved in transmission of data over the UART (position measurements, version numbers, and possible Fault codes). The source code may include a number of areas that may be conditionally compiled. These portions of the code may be utilized for Unit Testing.

The code may be designed to optimize simplicity, minimize code footprint, and execute at the required speed. The code may run with no interrupts, such that all timing is deterministic. This may simplify design and testing and may allow for more accurate measurement of the pin oscillator periods.

The microprocessor may not have sophisticated timers with hardware trigger and gates. To measure the period, the software may use counters to count the number of fixed frequency clocks which occur in a time interval specified by an integer number of pin oscillator cycles. One counter, TIMER B, may be used to provide an aperture which is an integer number of pin oscillator clocks. The pre-scaler in TIMER B may be set to its maximum value of 8 to increase the period to about 12 µs. 26 counts of TIMER B may be used to create a Time Gate of approximately 312 µs during which the number of 16 MHz system clocks will be counted. The Real Time Clock (RTC) free-running counter may be used to provide the counter for this measurement. TIMER B and the RTC may be read as close to one another as possible at both the Start and Stop of the measurements for the purpose of reducing noise. A tight polled loop may be used. The final value of the RTC counter may be a measure of period. This structure may ensure the minimum possible indeterminacy between the sampling of TIMER B and the RTC physical counters. Interrupts may be disabled during the entire measurement. These tight loops may be used for both the start and stop edges so the polled loop function is called twice for each of the 28 pins, first with the corresponding capacitive sensor grounded and once with the capacitive sensor floating. The difference between these periods may be calculated as $T_{pinon}-T_{pinoff}$, as referred to in the principle of operation above.

The capacitance change to be measured may be relatively small (e.g., less than 1 pF) and thus the measurement may be susceptible to external interference. Measurements may be most consistent when the Grounded Period measurement and the Floating Period Measurement (i.e. ON and OFF) are made close to one another in time. The software may use averaging to reduce noise. Averaging may be all within the inner loop, all within the outer loop or partially in the inner loop and partially within the outer loop.

After data collection, 28 measurements, one for each second capacitive sensor 46, may be collected. One or two of these measurements may be considerably larger than the average measurement. These larger measurements may be used to determine the location of the electrode 56 by determining a surface area of contact and overlap between the electrode 56 and the plurality of first and second capacitive sensors 44, 46. For example, if electrode 56 is located between two second capacitive sensors 46, the capacitance produced may be different than if electrode 56 solely within the width of one second capacitive sensor 46.

The aim of the software may be to generate the best estimate of the center position of the electrode 56 and a Figure of Merit for the measurement. The signal processing may consist of the following steps: Dynamic Baseline Removal, Peak Detection, Feedthrough Determination, Figure of Merit Calculations,Peak Position Adjustment, Dynamic Baseline Recalculation, Position Calculation, and Outputting the Result.

Dynamic Baseline Removal

The dynamic baseline may be based upon the observation that in the absence of any electrode 56 at all there may be a small response seen at some positions due to stray capacitances on the printed circuit board 48. The baseline may be measured in every location except around the vicinity of the target on every sweep of the measurements. The dynamic baseline array may be initiated at zero and may be acquired/refined at every pass through the algorithm for points relatively further from the target. The baseline may be subtracted out from every element of the measurement array during the array data acquisition. Use of this baseline may improve the accuracy of the position calculation.

Peak Detection

After the measurements have been acquired, there may be one pass through the score array during which both the peak height and the peak location may be determined.

Feedthrough Determination

During a second pass through all 28 measurements of the score array, both the Feedthrough Position and the Feedthrough Value may be calculated. The feedthrough position may be defined to be the position of the highest measurement exclusive of all regions that are within 2 locations of the peak position. The feedthrough value may be defined as the value at the feedthrough position corrected for offset.

Figure of Merit Calculations

Two Figures of Merit, FOMpeak and FOM2ndPeak, may be calculated. FOMpeak may be calculated as the ratio of the offset measured to the peak height and may be calculated as a percentage. The offset may be the average of all the 28 measurements (prior to Baseline Removal) excepting the peak and the points immediately adjacent to the peak. FOMpeak may test whether there appears to be a single clearly defined electrode position. For example, an FOMpeak value greater than 50% may indicate that the data set should be discarded. FOM2ndPeak may be calculated as the ratio of the feedthrough measured (i.e. the height of the second-highest peak as described above) to the peak height and may also be calculated as a percentage. A FOM2ndPeak value greater than 50% (Feedthrough=Peak/2) may also indicate that the data set should be discarded.

Peak Position Adjustment

The peak may have scoring bins on both the left and right-hand sides of the plurality of second capacitive sensors 46 along the elongate portion. When the Peak Position is 0 or 27, a peak position of 0 may be moved to 1 and a peak position of 27 may be moved to 26.

Dynamic Baseline Recalculation

The dynamic Baseline array may be re-calculated for all bins excluding the five bins in the immediate vicinity of the peak. A simple 16 value Kalman filter may be used and the array is stored at 16 times par value, i.e.:

$$\text{Baseline}[i] \mathrel{+}= \text{Score}[i] - (\text{Baseline}[i] \mathbin{>>} 4) \quad (4)$$

Position Calculation

The position of the target may be calculated by essentially interpolating among the three baseline-adjusted measurements comprising the peak and its two adjacent points. This may be accomplished by a simple weighted average of these three positions closest to the peak position, (i.e. if the peak position is p ($0<p<27$), the position is determined to be:

$$\text{Position} = (3*8) * \frac{(p-1)*\text{Score}[p-1] + p*\text{Score}[p] + (p+1)*\text{Score}[p+1]}{\text{Score}[p-1] + \text{Score}[p] + \text{Score}[p+1]} \quad (5)$$

The score array elements Score[ ] may be adjusted for offset and baseline and the units may be 125 μm.

Outputting the Result

The result may then be outputted. In the above example, there is a total of 84 mm of distance to report in 125 μm increments, therefore, valid readings may be in the range 0 through 672. 10 bits may be required as well as extra codes (673-1023) may be used as error codes or for messages. Since this cannot be compressed into 8 bits, 2 serial characters may be transmitted for each reading and the software may have to differentiate between the high byte and the low byte. There may be 6 bits to spare (16-10), which may be used for flagging errors via the microprocessor.

Watchdog Timer

A Watchdog Timer functionality may be built into the microprocessor and may be utilized so that if the software fails to reset the Watchdog Timer frequently throughout its operation (e.g., the code got into an infinite loop), the Watchdog Timer would reset the microprocessor, after which a Fault would be generated. During initialization/POST, the Watchdog Timer may be initialized, and then validated by allowing the Watchdog to reset the microprocessor one time.

Fault Conditions

Values transmitted above the maximum position measurement (672) may be used to signify Fault conditions. Faults may be transmitted by the function SendFault( ), which never returns and sends the fault code repeatedly as defined by the protocol. The Fault code may change during these repeated transmissions (e.g. in the unlikely event of an unexpected processor reset occurring while sending another Fault code). Faults may be generated during initialization and Power-On Self Test (POST) (e.g. if the power supply voltage was not within range during initialization). Faults may also be generated as a result of self-health checks performed during continuous operation, (e.g. the power supply voltage going out of range). During the critical pin oscillator period measurement by the PeriodMeasure( ) function, if the measurement is outside the expected range, a Fault may be sent.

The measurement may not be transmitted if the overall measurement is rejected based upon the Figures of Merit calculated on the Score array (lack of a single well-defined peak or presence of more than one peak). If after 4 consecutive passes (defined constants NONREPORTEDREADINGS_PEAK, NONREPORTEDREADINGS_2ND_PEAK, and NONREPORTEDREADINGS_COMBINED) through the measurement loop the readings are still being rejected, Faults may be generated and measurement stops. A Fault FAULT_READING_OFFSCALE may indicate that the reading calculated was greater than the expected maximum of 672.

A mechanism involved in Fault generation may be the ExecutionPhase, along with ExecutionRow and ExecutionPoint. These three words may be stored in BAKMEM, a portion of the processor's RAM that is preserved during a reset. Use of these words may allow Faults generated to reflect the stage of execution in which they occurred, even if the Fault is reporting an unexpected processor reset. ExecutionPhase may also be used during initialization and validation of the Watchdog Timer.

Power Supply Validation

During POST and thereafter during each measurement loop, the processor's power supply voltage (Vcc) may be measured to ensure that it remains within a specified range. This may be accomplished using the built-in ADC, which is configured to measure an internal reference voltage (1.5 Volts) using Vcc as the full-scale value of the ADC, allowing the Vcc voltage to be derived. This may be accomplished within the functions InitializeADC ( ) and CheckVccUsingADC 0. If at any point, the power supply is found to be outside the expected range, a Fault may be generated.

While illustrative examples are described above, it will be apparent to one skilled in the art that various changes and modifications may be made therein. Moreover, various apparatus or procedures described above are also intended to be utilized in combination with one another, as practicable. The appended claims are intended to cover all such changes and modifications that fall within the true spirit and scope of the invention.

What is claimed is:

1. A treatment system, comprising:
    a handle;
    an elongate shaft projecting from the handle;
    a sheath axially slidable relative to the elongate shaft;
    an electrode mounted on a proximal portion of the sheath;
    a substrate located within the handle, wherein the substrate comprises an elongate portion;
    a plurality of first capacitive sensors positioned along the elongate portion, each of the first capacitive sensors being aligned linearly and having a first length;

a plurality of second capacitive sensors positioned along the elongate portion adjacent to the plurality of first capacitive sensors, each of the second capacitive sensors being aligned linearly and having a second length which is less than the first length, wherein the electrode is configured to slide along the elongate portion during movement of the sheath while maintaining contact with at least one of the first capacitive sensors and at least one of the second capacitive sensors during movement of the sheath; and wherein the substrate is configured to determine an axial position of the electrode based on a coupling capacitance caused by the electrode overlapping one or more of the first capacitive sensors and one or more of the second capacitive sensors.

2. The treatment system of claim 1 wherein the first length is perpendicular to the second length.

3. The treatment system of claim 1 wherein the plurality of first and second capacitive sensors are positioned along a first lateral side of the elongate portion, wherein a plurality of first pin oscillator connections and a plurality of second pin oscillator connections are positioned along a second lateral side of the elongate portion, wherein each of the plurality of first capacitive sensors correspond with each of the plurality of first pin oscillator connections, and wherein each of the plurality of second capacitive sensors correspond with each of the plurality of second pin oscillator connections.

4. The treatment system of claim 3 wherein the plurality of first and second pin oscillator connections are each connected to at least one port on a microcontroller.

5. The treatment system of claim 3 wherein the substrate is configured to measure a period of oscillation of each of the first and second pin oscillator connections.

6. The treatment system of claim 1 further comprising a rotatable knob configured to retract the sheath.

7. The treatment system of claim 1 wherein the electrode is mounted on a slider block, wherein the slider block is configured to move axially with respect to the substrate.

8. The treatment system of claim 1 further comprising an expandable liner coupled to the elongate shaft.

9. The treatment system of claim 8 wherein proximal movement of the sheath relative to the elongate shaft exposes the expandable liner.

10. A method of treating tissue, comprising:

advancing an elongate shaft to a target site, the elongate shaft projecting from a handle;

sliding a sheath proximally relative to the elongate shaft, wherein the sheath has an electrode attached to a portion of the sheath; and determining an axial position of the sheath by measuring a coupling capacitance caused by the electrode overlapping one or more of a plurality of first capacitive sensors and one or more of a plurality of second capacitive sensors when the electrode slides along a substrate located within the handle, wherein the substrate comprises an elongate portion having the plurality of first capacitive sensors positioned along the elongate portion, each of the first capacitive sensors being aligned linearly and having a first length, wherein the substrate comprises the plurality of second capacitive sensors positioned along the elongate portion adjacent to the plurality of first capacitive sensors, each of the second capacitive sensors being aligned linearly and having a second length which is less than the first length.

11. The method of claim 10 wherein the first length is perpendicular to the second length.

12. The method of claim 10 wherein the substrate comprises a printed circuit board.

13. The method of claim 12 wherein measuring a coupling capacitance caused by the electrode overlapping one or more of the first capacitive sensors and one or more second capacitive sensors comprises maintaining contact between the printed circuit board and the electrode during movement of the sheath, and wherein the electrode is mounted on a proximal portion of the sheath via a sliding block.

14. The method of claim 10 wherein the plurality of first and second capacitive sensors are positioned along a first lateral side of the elongate portion, wherein a plurality of first pin oscillator connections and a plurality of second pin oscillator connections are positioned along a second lateral side of the elongate portion, wherein each of the plurality of first capacitive sensors correspond with each of the plurality of first pin oscillator connections, and wherein each of the plurality of second capacitive sensors correspond with each of the plurality of second pin oscillator connections.

15. The method of claim 14 wherein the first and second pin oscillator connections are connected to at least one port on a microcontroller.

16. The method of claim 15 further comprising measuring a period of oscillation of each of the first and second pin oscillator connections using the substrate.

17. The method of claim 10 further comprising exposing an expandable liner by retracting the sheath proximally, wherein the expandable liner is coupled to the elongate shaft at a distal end of the elongate shaft.

* * * * *